US007000106B2

(12) United States Patent
Carter

(10) Patent No.: US 7,000,106 B2
(45) Date of Patent: Feb. 14, 2006

(54) METHODS AND APPARATUS FOR KERNEL MODE ENCRYPTION OF COMPUTER TELEPHONY

(75) Inventor: George E. Carter, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/277,298

(22) Filed: Mar. 26, 1999

(65) Prior Publication Data

US 2003/0177354 A1 Sep. 18, 2003

(51) Int. Cl.
*H04L 9/00* (2006.01)

(52) U.S. Cl. ...................... 713/164; 713/164; 713/166; 713/193; 380/201; 380/205; 380/260; 380/274; 380/287; 709/230; 709/238; 709/250; 705/54; 370/354; 370/355; 710/65; 710/69; 704/500

(58) Field of Classification Search ................ 713/164, 713/166, 193; 710/65, 69; 370/354–355, 370/401; 709/230–238, 250; 705/57; 380/287, 380/274, 260, 201, 205; 704/500
See application file for complete search history.

(56) References Cited

U.S. PATENT DOCUMENTS 5,434,797 A * 7/1995 Barris ........................ 364/514
5,455,861 A * 10/1995 Faucher et al. ............. 380/266
5,675,793 A * 10/1997 Crick et al. .................... 713/1
5,742,596 A * 4/1998 Baratz et al. ............... 370/356
5,787,403 A 7/1998 Randle ........................ 705/43
5,794,207 A 8/1998 Walker et al. ................ 705/23
5,812,948 A 9/1998 Hjern et al. ................ 455/435
5,862,223 A 1/1999 Walker et al. ................ 308/25
5,867,495 A 2/1999 Elliott et al. ................ 370/352
5,889,774 A * 3/1999 Mirashrafi et al. .......... 370/353
5,974,043 A * 10/1999 Solomon .................... 370/352
5,999,965 A * 12/1999 Kelly ......................... 709/202
6,125,186 A * 9/2000 Saito et al. ................. 380/287
6,222,829 B1 * 4/2001 Karlsson et al. ............ 370/329
6,483,911 B1 * 11/2002 Capriotti ................ 379/201.03
6,597,687 B1 * 7/2003 Rao ........................... 370/352
6,603,774 B1 * 8/2003 Knappe et al. ............. 370/466
2002/0087761 A1 * 7/2002 Clapp et al. .................. 713/65

FOREIGN PATENT DOCUMENTS

WO WO 97/29581 8/1997
WO WO 98/11704 A 3/1998
WO WO 01/08377 2/2001

OTHER PUBLICATIONS

Better Online Soulution: BOS Appoints e-distribution for new IP telephony solution< M2 Presswire. Coventry: Mar. 31, 1999,p. 1, retrieved from ProQuest database Jul. 27, 2005.*

(Continued)

*Primary Examiner*—Christopher Revak
*Assistant Examiner*—Taghi T. Arani

(57) ABSTRACT

Disclosed is a computer-readable medium containing program instructions for configuring a first computer so that a first telephony client on the first computer may securely communicate with a second telephony client on a second computer via a communication path. The computer-readable medium includes computer code for inserting a security algorithm within the communication path. The security algorithm facilitates secure communication between the first and second telephony clients such that more than a single type of telephony client may be implemented. In a specific embodiment, the security algorithm is inserted within the first computer's operating system kernel.

31 Claims, 5 Drawing Sheets

OTHER PUBLICATIONS

NCTI Clear speech I-Phone software and NoiseBuster Headset Recognized as Best of CT Expo '98 by Computer Telephony Magazine, Business Wire, New Yprk: Apr. 29, 1998, p. 1, retrieved from ProQuest database Jul. 27, 2005.*

Zellweger, P. T., et al: "An overview of the Etherphone system and its applications", Computer Workstations, 1988., Proceedings of the 2nd IEEE Conference on Santa Clara, CA USA Mar. 7-10, 1988, Washington, D.C. USA, IEEE Comput. SOC. PR, US, pp. 160-168 XP 010011390 ISBN: 0-8188-0810-2.

*Dr. Dobb's Journal, Examining the Windows NTFilesystem.* "A layered organization with filesystem and hardware-device drivers" by Mark Russinovich and Bryce Cogswell. Feb. 1997.

* cited by examiner

METHODS AND APPARATUS FOR KERNEL MODE ENCRYPTION OF COMPUTER TELEPHONY

BACKGROUND OF THE INVENTION

The present invention relates generally to providing encryption in computer telephony systems. More specifically, the present invention relates to methods and apparatus for encrypting audio data that is transmitted between computer telephony systems, such as via a computer network.

As transmission speeds and bandwidth sizes increase, computer telephony is becoming increasingly more prevalent. Accordingly, several vendors now provide telephony application packages for home and business use. These telephony applications are typically loaded onto two or more computers so that two users of two computers may communicate telephonically.

The value that a telephony application provides to a particular user is generally proportional to the number of other users that also utilize a telephony application. For example, if all of the particular user's friends or colleagues also utilize a telephony application, the user will likely find the telephony application quite valuable and frequently use it to talk with his friends or colleagues. In contrast, if none of the particular user's friends or colleagues utilize a telephony software, the user will likely find their telephony software to be quite useless.

However, an increase in computer telephony users has associated disadvantages. For example, as the number of computer telephony users increases, it becomes more likely that the security of a particular user's communication may be breached by a hacker. That is, sabotage or pilfering of computer telephonic communications becomes more attractive to hackers as the number of users and corresponding telephonic communications increase.

In response to concerns about potential hackers, a few vendors of telephony applications have attempted to include security features within their application software. The security features are typically tightly integrated with formatting software modules that vary between different types of telephony applications. That is, the security algorithms are dependent on the formatting algorithms that are specifically designed for a particular telephony application from a particular vendor. Thus, conventional security features typically include decryption and encryption that only works on data, e.g., audio, that is sent between two users of the same telephony application.

Traditionally, the encryption of voice communication in computer telephony systems has occurred in "user mode": either in the application itself, in its coder/decoder (codec) components, or in the communication stack being used. As a result, encrypted audio communication between computer telephony clients produced by different companies is not possible with conventional security features. In other words, different telephony vendors do not offer compatible security mechanisms.

In view of the foregoing, there is a need for alternative, more flexible computer telephony apparatus and techniques that provide encryption and decryption for communication between different computer telephony clients.

SUMMARY OF THE INVENTION

Accordingly, the present invention provides apparatus and methods for encrypting and/or decrypting communications between computer telephony clients. In general terms, encryption and decryption mechanisms are inserted within the communication path between clients such that any type of telephony application or system may be implemented by the two clients. For example, both clients may implement Siemens' HiNet™ RC 3000 telephony software, or both clients may implement Microsoft's NetMeeting software. Alternatively, one client may implement telephony software from one telephony software vendor, and the other client may implement telephony software from a different telephony software vendor. Regardless of differences in telephony software being used by the two clients, their communications can be encrypted and decrypted in accordance with the present invention.

In one embodiment, the present invention provides a computer-readable medium containing program instructions for configuring a first computer so that a first telephony client on the first computer may securely communicate with a second telephony client on a second computer via a communication path. The computer-readable medium includes computer code for inserting a security algorithm within the communication path. The security algorithm facilitates secure communication between the first and second telephony clients such that more than a single type of telephony client may be implemented. In a specific embodiment, the security algorithm is inserted within the first computer's operating system kernel.

In another embodiment, the invention provides a method of configuring a first computer so that a first telephony client on the first computer may securely communicate with a second telephony client on a second computer via a communication path. A security algorithm is inserted within the communication path, and the security algorithm facilitates secure communication between the first and second telephony clients such that more than a single type of telephony client may be implemented.

In another aspect, the invention provides an operating system for use by a processor in directing operation of a computer upon which a first telephony client may execute to communicate with a second telephony client on a second computer via a communication path. The operating system includes at least one processor-readable medium, and a program mechanism embedded in the at least one processor-readable medium for causing the interpreting module to communicate securely with a second telephony client. The computer-readable medium has computer code for receiving audio signals from a network input device, computer code for decrypting the received audio signals independently of the interpreting module associated with the first telephony client, and computer code for outputting the decrypted audio signals for transmission to an audio output device.

In another aspect, the invention provides a method involving a telephonic signal that is transmitted from a first telephony system to a second telephony system. A telephonic session is initiated between the first and second telephony systems. A telephonic signal is formatted into a predetermined format that is recognizable by the second telephony system. The formatting is performed in response to a telephonic signal received into a telephonic input device of the first telephonic system. The telephonic signal is encrypted with a security algorithm, and the encrypting is independent of the formatting. The telephonic signal is transmitted to the second telephony system after the telephonic signal has been encrypted and formatted.

In an alternative embodiment, the invention provides a computer system for communicating telephonic signals between a first telephony system and a second telephony system. The computer system includes a formatting module arranged to configure telephonic signals into a first predetermined format that is recognizable by the second telephony system. The formatting is performed in response to a telephonic signal received into a telephonic input device of the first telephonic system. The computer system also includes an interpreter module arranged to recognize a second predetermined format of telephonic signals received from the second telephony system and a security module arranged to encrypt telephonic signals prior to transmission to the second telephony system and to decrypt telephonic signals received by the first telephony system. The encrypting is independent of the first predetermined format that is recognizable by the second telephony system, and the decryption is independent from the second predetermined format of telephony signals received by the first telephony system.

The present invention has many advantages. For example, independent security mechanisms allow changes to be made to the formatting mechanisms required or utilized by particular telephony application without requiring changes to existing security mechanisms. Likewise, changes to the security mechanisms do not require changes to the formatting mechanisms implemented by particular telephony applications. Additionally, security mechanisms do not have to be developed for each unique telephony formatting technique. As a result, costs of developing secure telephony applications may be significantly reduced.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Figure 1A:
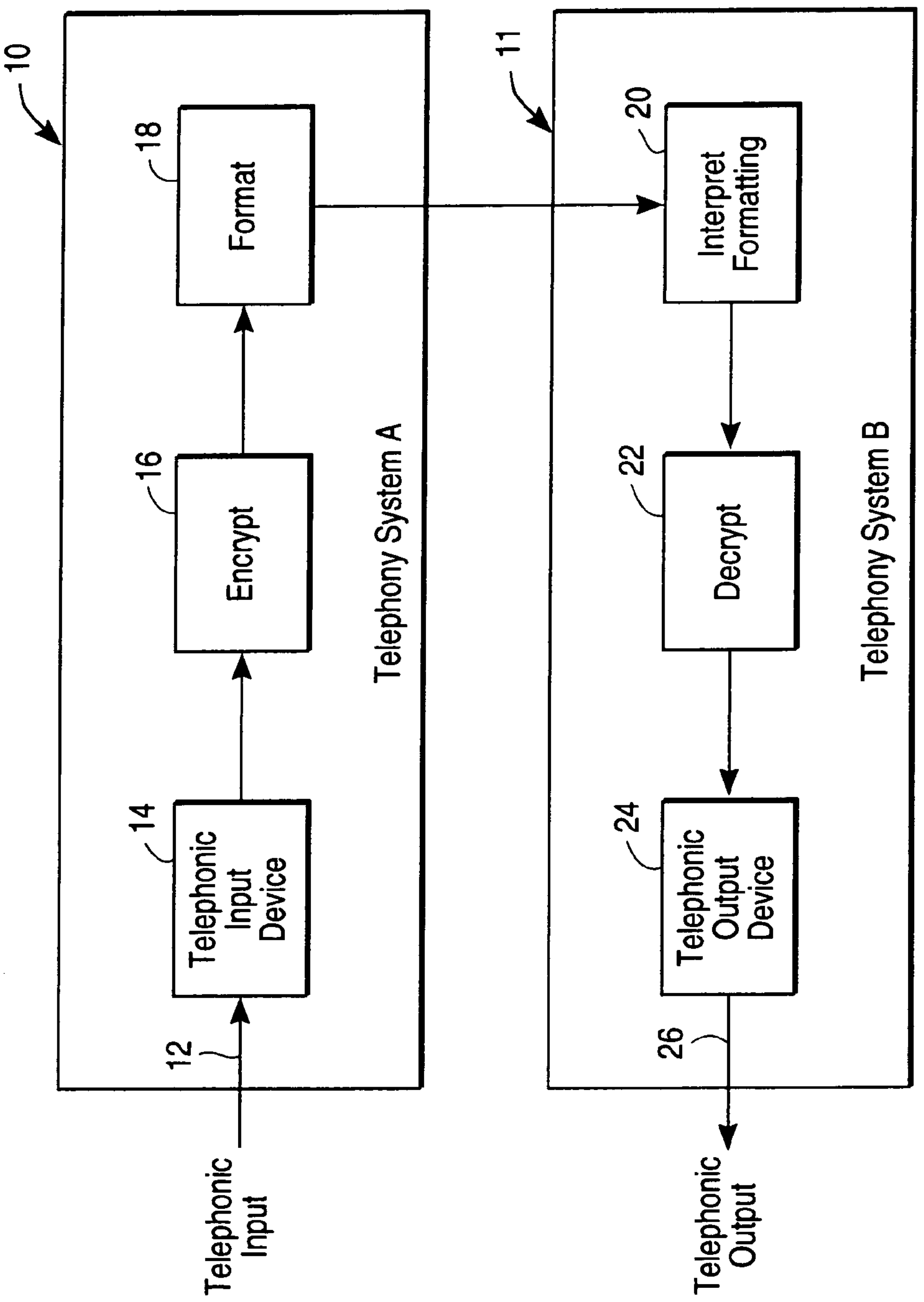
FIG. 1A represents a generalized flow path for telephonic signals transmitted from a first computer telephony system and received by a second computer telephony system in accordance with an embodiment of the present invention.

FIG. 1A represents a generalized flow path for telephonic signals transmitted from a first computer telephony system 10 and received by a second computer telephony system 11 in accordance with one embodiment of the present invention. Although FIG. 1A shows the first telephony system 10 as having only transmission components and the second telephony system 11 as having only reception components, this simplified view is merely used to facilitate discussion and so as to not unnecessarily obscure the invention. Of course, each telephony system may include both transmission and reception components. A more detailed embodiment of the computer telephony system of the present invention is described below in reference to FIG. 1B. It should be noted that "computer telephony" client or system can refer to a telephony-enabled computer or an H.323-compliant (or Session Initiation Protocol-compliant) telephone.

Turning to the transmission side, which is represented by telephony system 10, telephonic signals 12 are received into a telephonic input device 14. For example, a user talks into a telephone. The input device 14 may be in the form of any suitable mechanism for receiving telephonic signals (e.g., voice or audio signals) and converting them into computer-readable signals. For example, the input device 14 may include a microphone, a sound card, and various sound card interface software modules or drivers for converting the analog telephonic signals into a binary representation of 1's and 0's.

The received telephonic signals 12 are processed by the input device 14 and then may be encrypted by block 16. Additional processing of the telephonic signals may occur after encryption. For example, the telephonic signals may be suitably formatted for the particular interface requirements of the operating system or the telephony client.

Any encryption algorithms that are suitable for securing telephony communications may be implemented. By way of specific examples, the IDEA encryption algorithm, the DES encryption algorithm, the GOST algorithm, the RC5 algorithm, the SEAL algorithm, or key file encryption may be utilized for the present invention. Of course, other types of encryption algorithms used in other applications (besides telephony), such as file transfer, may be adapted for use in the present invention.

As shown in FIG. 1A, after being encrypted, the telephonic signals are formatted in block 18 into a particular format that is recognized and implemented by the receiving computer telephonic system 11. For example, the telephonic signals are compressed using a particular compression algorithm that is recognized by computer telephony system 11. By way of another example, formatting may be performed to meet the requirements of various standard protocols, such as H.323, RTP (Real Time Protocol), TCP (Transmission Control Protocol), and IP (Internet Protocol).

This formatting block 18 may include any formatting that is required by a particular telephony system arrangement. For example, particular telephony applications require different compression routines or codecs, such as G.711, G.723, and G.729 codecs By way of another example, different telephony applications require different communication stack implementations. Instead of the H.323 standard noted above, alternative formats, such as SIP (Session Initiation Protocol), may be employed. processor to facilitate secure communication between the first and second telephony clients such that any combination of types of telephony clients may be implemented.

In an alternative embodiment, the present invention provides a computer-readable medium containing program instructions for a first telephony system to communicate securely with a second telephony system. The first telephony client is configurable to include a sound card and an associated driver, a general purpose sound driver for interfacing with the sound card's associated driver, a network card and associated driver, a general purpose networking driver for interfacing with the network card's associated driver, a telephony client, an I/O supervisor for interfacing between the telephony client and the general purpose networking and sound drivers. In this embodiment, the computer-readable medium includes computer code for inserting a filter driver between the I/O supervisor and the general purpose sound driver. The filter driver is capable of encrypting audio signals received into the sound card prior to the audio signals being received by the telephony client and transmitted to the network card, and the filter driver is also capable of decrypting audio signals received by the network card and passed through the telephony client to the filter driver. The decryption occurs prior to transmitting the audio signals to the sound card.

In another embodiment, the invention provides a computer-readable medium containing programming instructions for a first telephony client having an associated formatting module to communicate securely with a second telephony client. The computer-readable medium includes computer code for receiving audio signals from an audio input device, computer code for encrypting the received audio signals independently of the formatting module associated with the first telephony client, and computer code for outputting the encrypted audio signals for transmission to the second telephony client.

In yet another aspect, the present invention provides a computer-readable medium containing programming instructions for a first telephony client having an associated Turning now to the receiving side, the encrypted and formatted signals are then passed to the receiving computer telephony system 11, where the signals are interpreted by block 20 of telephony system 11. By way of example, the signals may be decompressed in block 20.

The telephony signals may then be decrypted in block 22. The decrypted and interpreted signals are then passed to telephonic output device 24. The telephonic output device 24 functions to convert the decrypted telephonic signals into audio signals 26. For example, the output device 24 may be in the form of audio speakers, a sound card, and sound card software or drivers.

As illustrated in FIG. 1A, for the present invention, encryption and decryption is performed separately from the formatting that is unique to the particular telephony application or system being used. That is, encryption and/or decryption functions are independent from any formatting functions that are different between different computer telephony applications and systems. For example, encryption does not depend on which type of compression algorithm is being implemented. Thus, the present invention provides several advantages. For instance, a generic encryption or decryption module may be utilized with any type of telephony application. Consequently, if the telephony application's formatting algorithms are changed, the encryption and decryption module does not also require modification. Additionally, a separate security module does not have to be created for each new telephony application and corresponding new formatting techniques. In sum, the partitioning of the specialized formatting mechanisms from the security mechanisms may significantly increase the versatility and reduce the costs of providing computer telephony systems.

In some embodiments, the security algorithms are also independent from the telephony application code itself. That is, the security module and the telephony application are separate software modules. Thus, the security module and telephony application software may be developed and changed independently. For example, the security module may be written in a different programming language than the telephony application software.

Figure 1B:
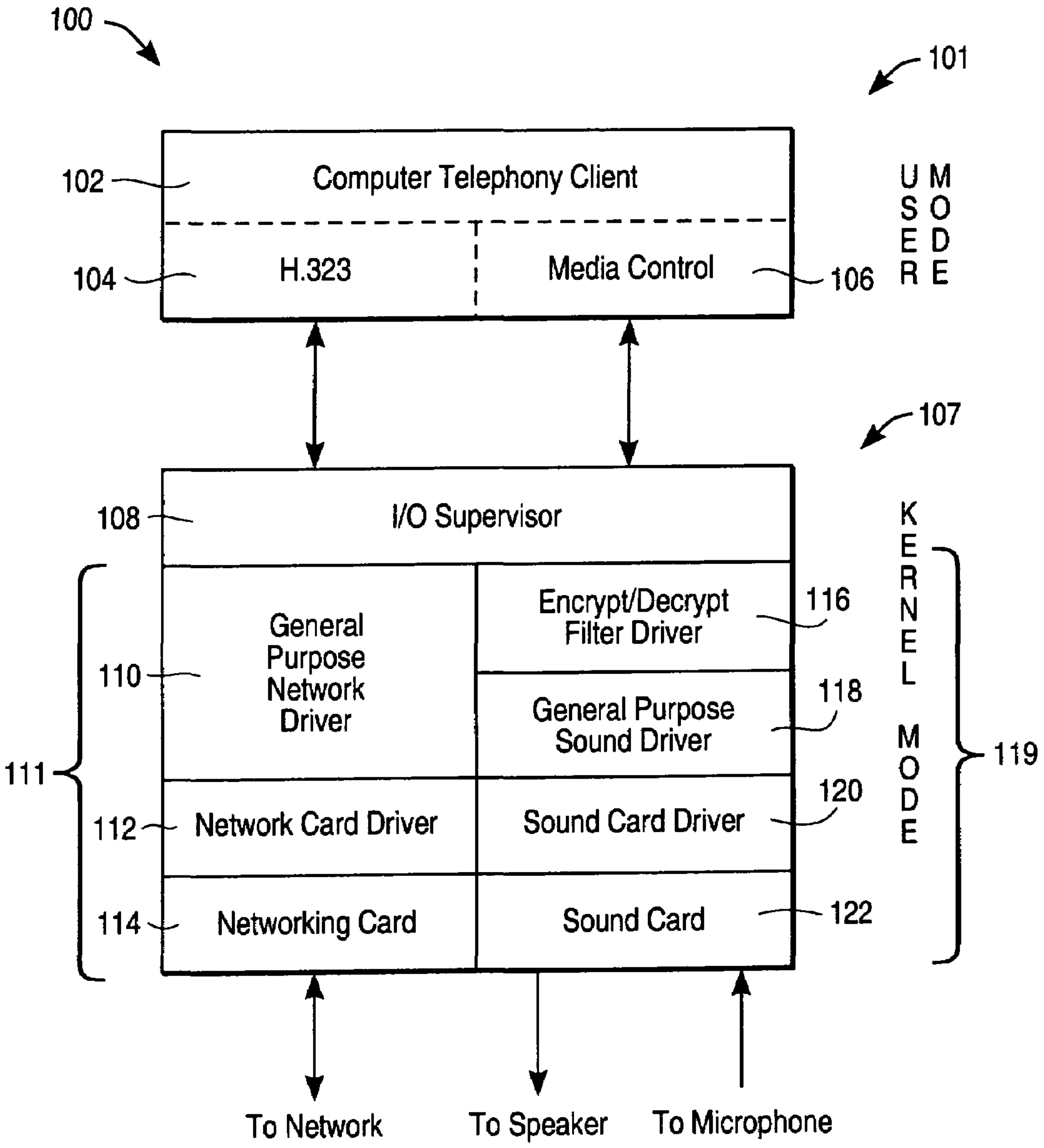
FIG. 1B is a diagrammatic representation of a computer telephony system implemented within an operating system environment having a user mode and a kernel mode in accordance with a specific embodiment of the present invention.

FIG. 1B is a diagrammatic representation of a computer telephony system 100 implemented within an operating system environment having a user mode and a kernel mode in accordance with one embodiment of the present invention. In general terms, FIG. 1B shows an audio and a network path structure that are both utilized by a computer telephony client 102 to communicate with another computer telephony system (not shown). As shown, the telephony system 100 includes a computer telephony client 102 coupled to a network device 111 (which typically includes both hardware and software components) for communicating signals to and from a second computer telephony system (not shown), and an audio device 119 (which typically includes both hardware and software components) for receiving sounds from a user, for example, and generating sounds.

Turning to the transmission side, one or more sounds are received by the audio device 119. As described above, the audio device may include any suitable mechanisms for translating sounds to computer-usable signals. In the illustrated embodiment, sound is received (e.g., by a user talking) into a microphone coupled to a sound card 122. The sound card 122 generally functions in conjunction with a sound card driver 120 to convert the analog audio signals into digital audio signals and perform any formatting required by the operating system or telephony client or application. The conversion and formatting functions may be implemented by any combination of hardware and/or software modules. By way of examples, the sound card 122 may include an application specific integrated circuit (ASIC) for quickly performing well known processing functions and/or may include programmable logic devices (PLD) for implementing rapidly changing processing functions and/or may include one or more digital signal processors (DSPs) for performing specialized computations.

Many types of sound cards and associated drivers are currently available that each uniquely processes the audio signals. For example, some sound cards and drivers include processing functions that are specific to the telephony application being used. Some sound cards and drivers may implement the popular compression algorithm G.711 codec. Alternatively, other sound cards and drivers will not include the G.711 codec, but leave that function to be performed by the telephony client, or do include G.711 but allow this on-board codec to be bypassed.

The audio signals are then typically passed to a general purpose sound driver 118. While the sound card driver 120 specifically interfaces only with the associated sound card 122, the general purpose sound driver 118 is capable of interfacing with various types of sound card drivers and their associated sound cards. Without implementation of the present invention, the audio signals would then have been received by an input/output (I/O) supervisor 108.

One of the functions of the I/O supervisor 108 is to determine how to route various data between various software application clients that run on top of the operating system and various software modules for interfacing with the peripherals that are coupled to the computer system. In one embodiment, if the audio signals are in the form of computer telephonic signals, the I/O supervisor 108 routes the audio signals to computer telephony client 102. The telephony client 102 then makes a request to the I/O supervisor 108 to route the audio signals to a second computer telephony client (not shown).

The second telephony client may be located on another computer that is coupled with a LAN network, which may itself be coupled to a WAN network. A computer network typically includes a set of communication channels interconnecting a set of computing devices or nodes that can communicate with each other. These nodes may be computers, terminals, workstations, or communication units of various kinds distributed over different locations. They communicate over communications channels that can be leased from common carriers (e.g. telephone companies) or are provided by the owners of the network. These channels may use a variety of transmission media, including optical fibers, coaxial cable, twisted copper pairs, satellite links or digital microwave radio. The nodes maybe distributed over a wide area (distances of hundreds or thousands of miles) or over a local area (distances of a hundred feet to several miles), in which case the networks are called wide area (WAN) or local area (LAN) networks, respectively. Combinations of LANs and WANs are also possible by coupling widely separated LANs, for example in branch offices, via a WAN.

In the illustrated embodiment, the audio signals are directed through the network path or network device 111 toward networking card 114. The network device includes any suitable software and/or hardware modules for communicating over a particular type of network, such as IP or ATM (Asynchronous Transfer Mode) networks. As shown, the network device 111 includes a network card 114, a network card driver 112 for a particular network, and a general purpose network driver 110.

Initially, the audio signals are passed by the I/O supervisor 108 through the general purpose network driver 110. The general purpose network driver 110 is capable of communicating the audio signals to various types of networking card drivers and their associated networking cards. As shown, the general purpose driver provides an interface between the I/O supervisor 108 and the network card driver 112.

The network card driver 112 is typically responsible for interfacing with the network card. For example, the network card driver 112 indicates to the network card 114 that it has audio signals or data to transmit to the network. The network card 114 then communicates that it is ready to receive a block of audio data, and the network card driver 112 then transmits a block of audio data along with any necessary information, e.g., data length. The audio data are then passed through a network, such as a LAN and/or WAN network, to the second computer telephony client.

Turning to the receiving side, audio signals are received into the networking card 114 from a transmitting computer telephony client via the network. The received signals are then processed by both the network card 114 and the network card driver 112. The network card driver 112 converts the received electrical signals into computer-readable signals, e.g., binary data. The network card 114 and/or driver 112 may also provide mechanisms for storing data and controlling flow (e.g., provide collision control). Additionally, the network card 114 and/or driver 112 recognizes particular data formats of a particular type of network. In contrast, the general purpose network driver 110 recognizes and interfaces with data received from various types of network cards.

The received signal is then passed to the I/O supervisor 108, where it is then passed to the computer telephony client 102. The telephony client 102 may include mechanisms for interfacing with one or more network paths and media paths (e.g., the sound card and sound drivers). As shown, the telephony client 102 includes a H.323 module 104 for carrying out the formatting requirements of the H.323 standard as applied over the network. The telephony client 102 also includes a media control module 106 for interfacing with various media devices through the I/O supervisor 108.

The H.323 module 104 includes implementation of the Real Time Protocol (RTP), which expects audio signals to be formatted into datagrams and transmitted via a connectionless setup. The RTP of the H.323 module specifies what is done to the audio data. By way of example, the RTP packetizes the audio data and adds an RTP header to the packetized audio data prior to transmitting it to another telephony system.

After the audio signals are suitably formatted to comply with any networking standards, the I/O supervisor 108 then receives a request from the telephony client 102 to send the received signal through the general purpose sound driver 118, the sound card driver 120, and into the sound card 122. The sound card 122 outputs the received signal onto one or more speakers.

The media control 106 may select and implement an appropriate decompression algorithm on the received audio data. For example, the media control 106 may select a particular codec that was used to compress the incoming data. On the transmission side, the media control module 106 may select and implement a particular compression algorithm (e.g., codec) on the audio data based on the particular telephony client software being used. In other words, different vendors of telephony client software utilize different codecs.

The present invention provides mechanisms for encrypting and decrypting various sound signals independently of the processing preformed by computer telephony client 102. That is, the encryption and decryption are performed in the same way regardless of the particular formatting implemented by the telephony client 102. For example, regardless of which particular codec is implemented by a particular telephony client 102, the encryption and decryption functions are the same.

In the illustrated embodiment of the present invention, an encryption and decryption filter driver 116 is inserted between the I/O supervisor 108 and the general purpose sound driver 118. As a result, audio signals may be passed to and from the telephony client 102 for various formatting functions and also independently passed to and from the encryption/decryption filter driver 116. In other words, the audio signal are encrypted and decrypted independently of the telephony client formatting.

Any suitable operating system may be implemented with the present invention. Preferably, the present invention is implemented within a Microsoft Windows NT environment, which currently provides mechanisms for inserting custom built drivers within the kernel mode. Other operating systems may be modified to include a similar insertion feature for providing the filter driver 116 of the present invention in a suitable location.

As shown, the telephony system 100 includes software and/or hardware that are implemented in either a user mode 101 or a kernel mode 107. For example, vendor-specific applications are executed within the user mode 101. As shown in FIG. 1B, the computer telephony client 102 and associated media control module 106 and H.323 module 104 run within the user mode 101.

In addition to user mode software and/or hardware, the kernel mode 107 generally executes operating system services for various important network connections and media control. Typically, the kernel is responsible for memory management, process, task, and hardware management. For example, as shown, the I/O supervisor 108 is provided within the kernel mode 107 as an interface between the computer telephony client 102 and a networking card 114, as well as a sound card 122. Thus, various software and/or hardware modules are implemented and layered between the networking card and computer telephony client, as well as between the sound card and the computer telephony client.

The encryption and decryption module may have any suitable location within the communication path such that the encryption and/or decryption is independent from any unique formatting functions implemented by the particular computer telephony clients. In the embodiment illustrated in FIG. 1B, the encryption/decryption filter driver 116 is located within the kernel mode portion 107. A technique for inserting the a driver within the kernel of the Windows NT operating system is described in *Examining the Windows NT File System*, Dr. Dobb's Journal, February 1997, the entirety of which is incorporated herein by reference for all purposes.

The encryption/decryption filter driver 116 may be implemented in any suitable manner. For example, a user interface may be provided by the computer telephony client itself or within a separate utility for inserting the filter driver. The user interface may prompt the user for whether encryption and/or decryption is desired for subsequent telephonic communications. Alternatively, selection of encryption and/or decryption may depend on one or more system parameters that are set by a system administrator, for example.

Insertion of the encryption/decryption filter driver may depend on whether or not the user selects encryption and decryption, in accordance with specific embodiments. That is, the filter driver is only loaded when the user selects encryption and decryption. Alternatively, the filter driver may be loaded regardless of the user's choice, and the user's choice is integrated within the filter driver software itself. For example, an encryption and/or decryption flag may be set or cleared by the user's selection to indicate whether or not to perform decryption and/or encryption.

Figure 2:
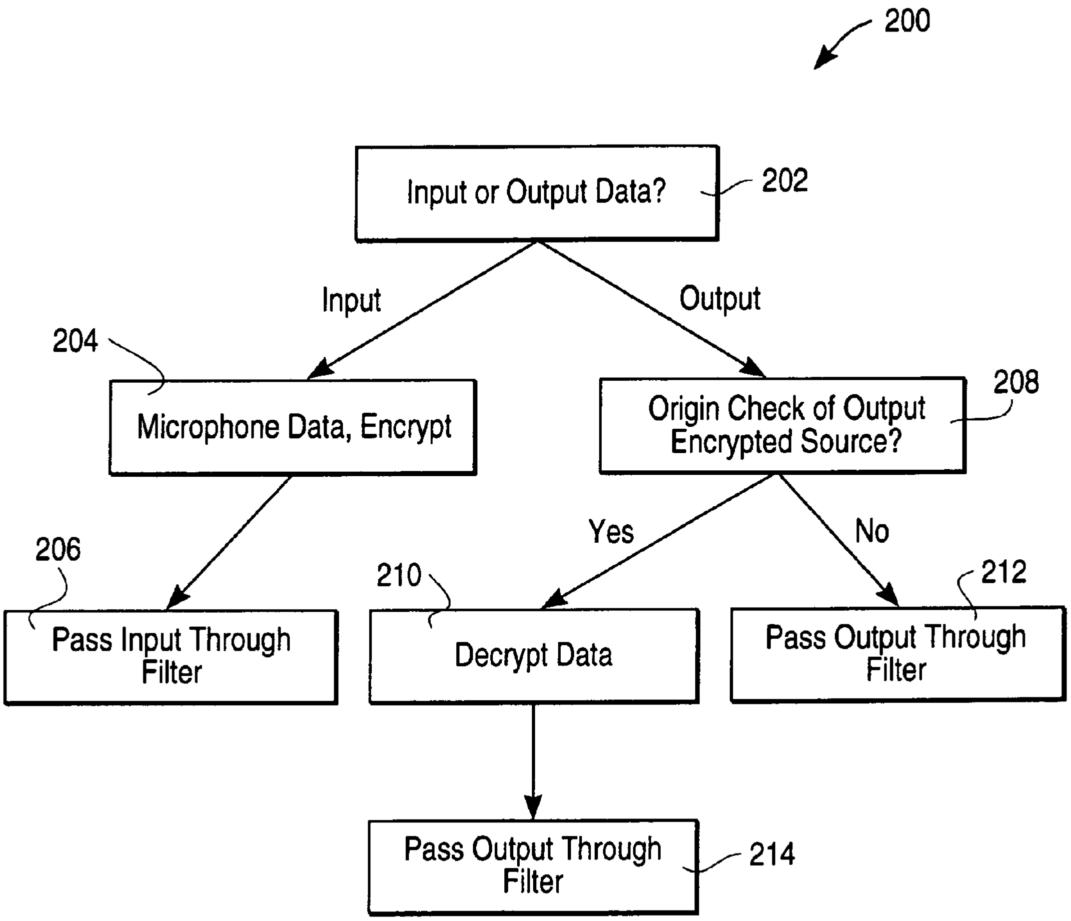
FIG. 2 is a diagrammatic representation of the decision-making flow of an encryption filter driver that is loaded only when encryption and/or decryption is selected in accordance with a specific embodiment of the present invention.

FIG. 2 is a diagrammatic representation of the decision-making flow of an encryption/decryption filter driver that is loaded only when encryption and/or decryption is selected in accordance with one embodiment of the present invention. Initially, input data is distinguished from output data in block 202. Input data may be in the form of audio data that a first user inputs into a microphone, for example. Output data may be in the form of audio data that is received from another telephony client via a network path (e.g., as represented by the networking card 114, the network card driver 112, and the general purpose network driver 110 of FIG. 1B).

If input data is present, it is encrypted within block 204. For example, the microphone data is encrypted. In this embodiment, when the filter driver is loaded, it is assumed that encryption has already been selected. The encrypted data is then passed through the filter to the I/O supervisor in block 206.

For output data, it is first determined whether the output data is encrypted in block 208. If it is encrypted, the output data is decrypted in block 210, and the decrypted data is then passed through the filter and through the sound path (e.g., the general purpose sound driver 118, the sound card driver 118, the sound card 122) in block 214. If, however, the output data is not encrypted, it is merely passed through the filter in block 212 without decrypting it.

FIG. 2 only represents one mechanism for encrypting and decrypting telephony data. As described above, encryption does not necessarily occur automatically upon loading of the filter driver. In other words, more flexibility may be incorporated into the decision-making process. For example, the user's selection of encryption and/or decryption may result in modification of the encryption/decryption filter driver itself.

Figure 3:
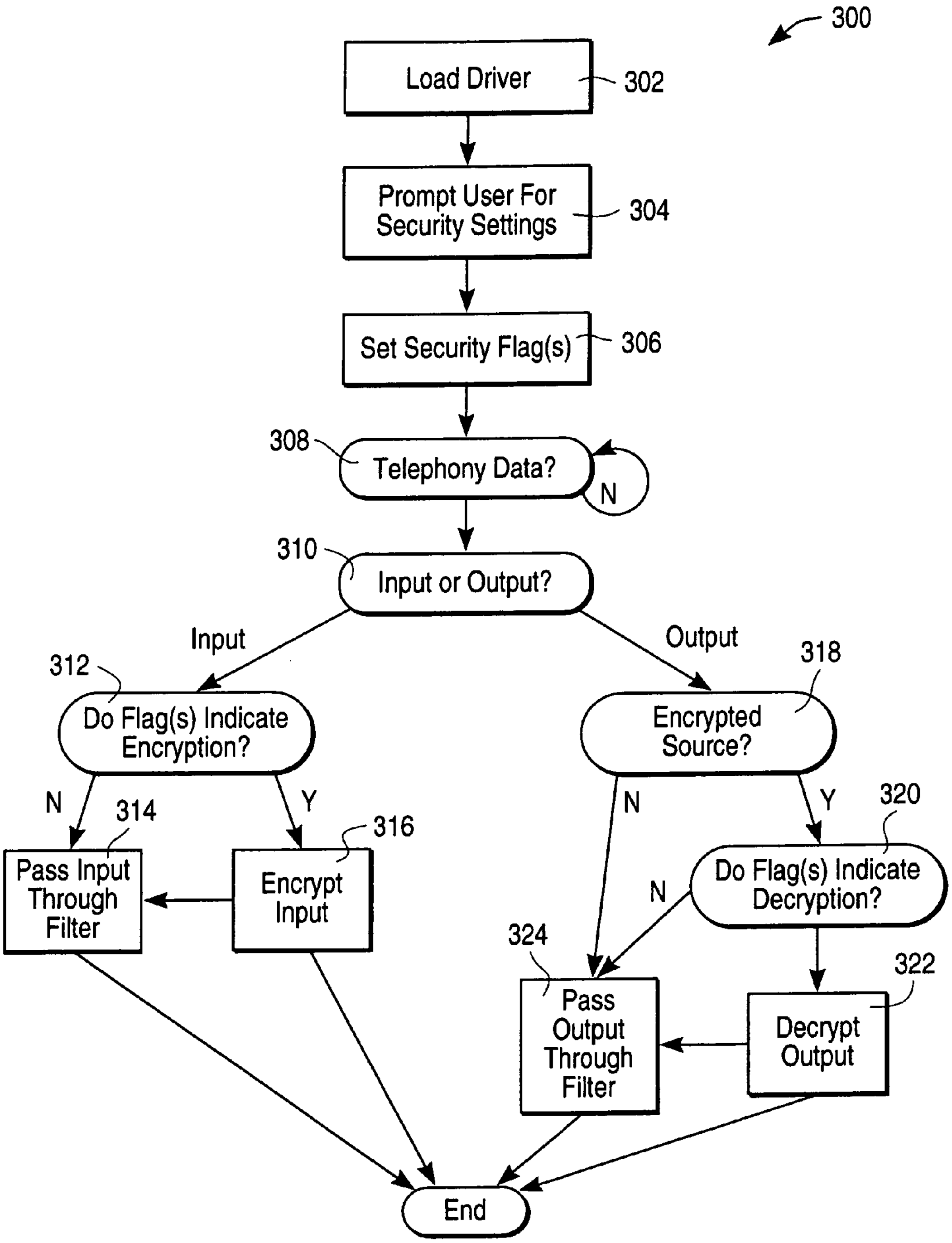
FIG. 3 is a diagrammatic representation of a decision-making process implemented by a filter driver having programmable encryption and/or decryption flags in accordance with an alternative embodiment of the present invention.

FIG. 3 is a diagrammatic representation of a decision-making process 300 implemented by an encryption/decryption filter driver 116 having programmable encryption and/or decryption flags in accordance with an alternative embodiment of the present invention. Initially, the driver is loaded in block 302. The user is then prompted to select security settings in block 304. That is, the user may be prompted to select whether to encrypt or not. One or more security flags are then set in block 306. For example, an encryption flag may be set to a value of zero for encryption, and a value of one for no encryption. Likewise, a decryption flag may be set to a value of zero for decryption, and a value of one for no decryption.

Although blocks 302 through 306 are described as being implemented within the filter driver itself, of course, they may also be implemented within other software modules. For example, the telephony application software may include a graphical user interface (GUI) for prompting the user to select or deselect encryption and/or encryption. Alternatively, a GUI may be provided by a utility for inserting the filter driver. Of course, a GUI is not required. That is, encryption and/or decryption may automatically be selected based on particular system parameters.

It is then determined whether there is any incoming or outgoing telephony data in block 308. When there is telephony data present, it is then determined whether the data is incoming or outgoing data in block 310. If the data is in the form of output data, the process 300 may proceed in the same way as the output branch of FIG. 2 if decryption is not selectable (e.g., decryption depends only on whether the output data is encrypted). However, decryption may be selectable, for example, when other available decryption mechanisms may be desired, in place of the filter decryption mechanism. For example, a user may wish to use decryption mechanisms that are available within the telephony client software. In this case, it is initially determined whether the output data is encrypted in block 318.

If the output data is encrypted, it is determined whether the decryption flag indicates decryption in block 320. If the flag indicates decryption, the output data is decrypted in block 322. The decrypted output data is then passed through the filter in block 324. Of course, if it is determined in block 318 that the source is not encrypted, the output data is passed through the filter in block 324 without decryption being performed and process 300 ends. Additionally, if it is determined in block 318 that the source is encrypted but decryption is not indicated, the output data is also passed through the filter without encryption in block 324 and process 300 ends.

For input data, it is initially determined whether the encryption flag indicates encryption in block 312. If encryption is indicated, the input data is encrypted in block 316, and the encrypted input data is then passed through the filter in block 314. However, if the flag does not indicate encryption, the input data is merely passed through the filter in block 314 without encryption being performed. The process 300 then ends.

Figure 4:
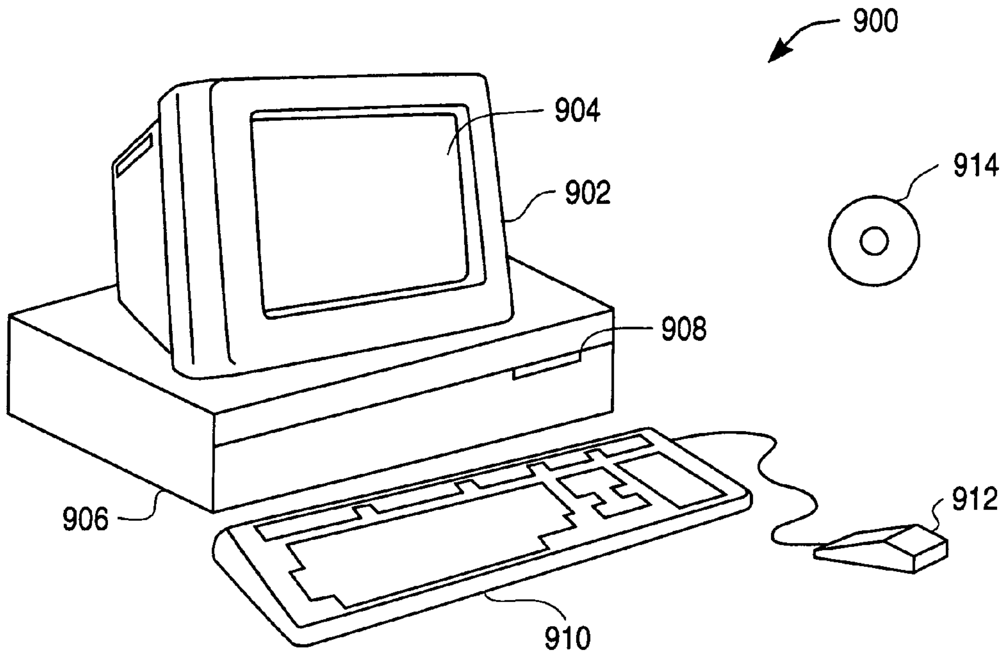
FIG. 4 illustrates a computer system suitable for implementing some specific embodiments of the present invention.
Figure 4:
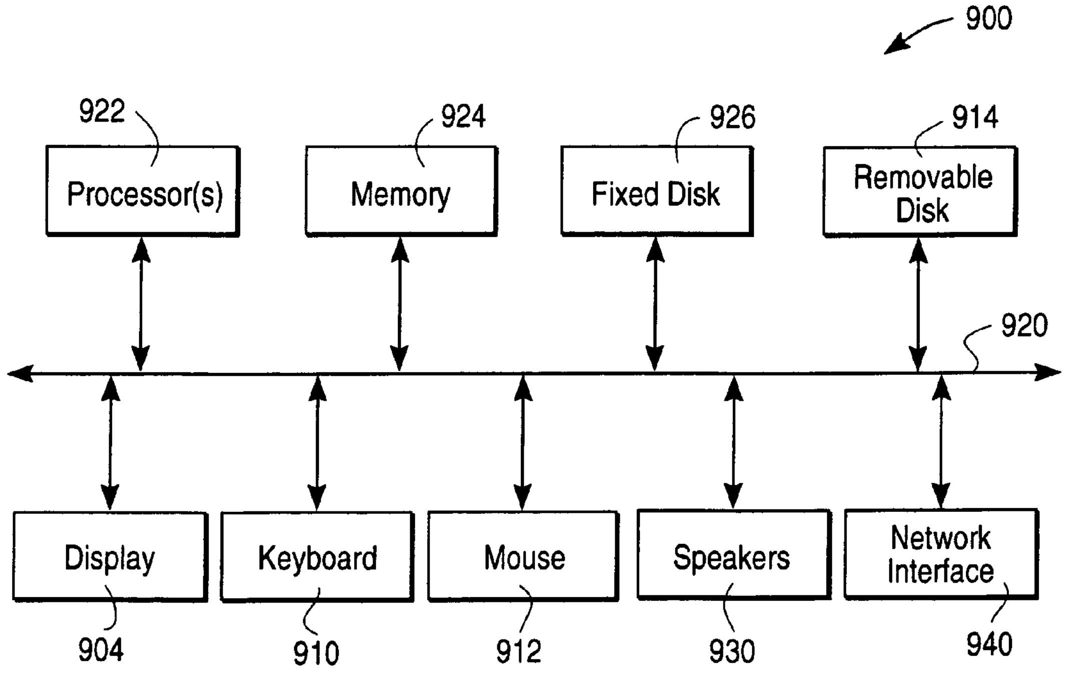

FIG. 4 illustrates a computer system 900 suitable for implementing embodiments of the present invention. FIG. 4 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable combination of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described telephony fictions. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, encryption and decryption mechanisms may be integrated within the original operating system software itself, consequently, insertion of a filter driver would not be required. Accordingly, the present embodiments are to be considered as illustrative and not restrictive, and the invention is not to be limited to the details given herein, but may be modified within the scope and equivalents of the appended claims.

What is claimed is:

1. A computer readable medium containing program instructions for configuring a first computer so that a first telephony client on the first computer may securely communicate with a second telephony client on a second computer via a communication path, the computer readable medium comprising:

computer code causing the first computer to perform operations comprising inserting a security algorithm within the communication path between the first telephony client and a sound device on the first computer, the security algorithm performing cryptographic operations on audio data transmitted in at least one direction between the first telephony client and the sound device;

wherein the first computer has an operating system kernel in the form of an operating system having an I/O supervisor and a sound card driver, and the computer code causes the first computer to perform operations comprising inserting the security algorithm within the first computer's operating system kernel between the I/O supervisor and the sound card driver, the security algorithm being configured as a filter driver.

2. A computer-readable medium as recited in claim 1, wherein the security algorithm operates independently of the first telephony client and the second telephony client.

3. A computer-readable medium as recited in claim 1, wherein the security algorithm is selected from a group consisting of an IDEA encryption algorithm, a DES encryption algorithm, a GOST algorithm, an RC5 algorithm, and a SEAL algorithm.

4. A computer-readable medium as recited in claim 1, wherein the security algorithm is not implemented within a user mode of the first computer's operating system.

5. A computer-readable medium as recited in claim 1, wherein the security algorithm encrypts audio data received from the sound device and transmits encrypted audio data to the first telephony client.

6. A computer-readable medium as recited in claim 1, wherein the security algorithm decrypts audio data received from the first telephony client and transmits decrypted audio data to the sound device.

7. A computer-readable medium containing program instructions for configuring a first computer so that a first telephony client on the first computer may securely communicate with a second telephony client on a second computer via a communication path, the computer readable medium comprising:

computer code causing the first computer to perform operations comprising inserting a security algorithm within the communication path between the first telephony client and a sound device on the first computer, the security algorithm performing cryptographic operations on audio data transmitted in at least one direction between the first telephony client and the sound device;

wherein the security algorithm is not implemented within a user mode of the first computer's operating system and the security algorithm is independent from the first or second telephony clients or any codecs or communication stacks used in conjunction with the first or second telephony clients.

8. A method of configuring a first computer so that a first telephony client on the first computer may securely communicate with a second telephony client on a second computer via a communication path, the method comprising:

inserting a security algorithm within the communication path between the first telephony client and a sound device on the first computer, the security algorithm performing cryptographic operations on audio data transmitted in at least one direction between the first telephony client and the sound device;

wherein the first computer has an operating system kernel in the form of an operating system having an I/O supervisor and a sound card driver, and the inserting comprises inserting the security algorithm within the first computer's operating system kernel between the I/O supervisor and the sound card driver, the security algorithm being configured as a filter driver.

9. A method as recited in claim 8, wherein the security algorithm operates independently of the first telephony client and the second telephony client.

10. A method as recited in claim 8, wherein the security algorithm is inserted within the first computer's operating system kernel.

11. A method as recited in claim 8, wherein the security algorithm encrypts audio data received from the sound device and transmits encrypted audio data to the first telephony client.

12. A method as recited in claim 8, wherein the security algorithm decrypts audio data received from the first telephony client and transmits decrypted audio data to the sound device.

13. An operating system for use by a processor in directing operation of a computer upon which a first telephony client may execute to communicate with a second telephony client on a second computer via a communication path, the operating system comprising:

at least one processor-readable medium;

an I/O supervisor embedded in the at least one processor-readable medium;

a sound card driver embedded in the at least one processor-readable medium; and a program mechanism embedded in the at least one processor-readable medium for causing the processor to facilitate secure communication between the first and second telephony clients by performing between the I/O supervisor and the sound card driver cryptographic operations on audio data transmitted in at least one direction between the first telephony client and a sound device on the first computer.

14. A computer-readable medium containing programming instructions for a first telephony client having an associated formatting module to communicate securely with a second telephony client, the computer readable medium comprising:

computer code for receiving audio signals from an audio input device;

computer code for encrypting the received audio signals independently of the formatting module associated with the first telephony client, wherein the formatting module is different for different types of telephony clients and the encrypting is independent of telephony client type; and computer code for transmitting the encrypted audio signals to formatting module.

15. A computer-readable medium as recited in claim 14, wherein the formatting module is configured to compress the audio signals using an algorithm selected from a group consisting of a G.711 codec, a G.723 codec, and a G.729 codec.

16. A computer readable medium as recited in claim 14, wherein the first telephony client has a different type than the second telephony client.

17. A computer readable medium containing programming instructions for a first telephony client having an associated formatting module to communicate securely with a second telephony client, the computer readable medium comprising:

computer code for receiving audio signals from an audio input device;

computer code for encrypting the received audio signals independently of the formatting module associated with the first telephony client; and computer code for transmitting the encrypted audio signals to the formatting module, wherein the formatting module is implemented in a sound card driver that is configured to interface with a sound card that receives and outputs audio signals.

18. A computer readable medium containing programming instructions for a first telephony client having an associated formatting module to communicate securely with a second telephony client, the computer readable medium comprising:

computer code for receiving audio signals from an audio input device;

computer code for encrypting the received audio signals independently of the formatting module associated with the first telephony client, wherein encrypting is also performed independently from a communication stack implemented by the first telephony client; and computer code for transmitting the encrypted audio signals to the formatting module.

19. A computer readable medium containing programming instructions for a first telephony client having an associated formatting module to communicate securely with a second telephony client, the computer readable medium comprising:

computer code for receiving audio signals from an audio input device;

computer code for encrypting the received audio signals independently of the formatting module associated with the first telephony client, wherein encrypting is performed independently from the first telephony client; and computer code for transmitting the encrypted audio signals to the formatting module.

20. A computer readable medium containing programming instructions for a first telephony client having an associated formatting module to communicate securely with a second telephony client, the computer readable medium comprising:

computer code for receiving audio signals from an audio input device;

computer code for encrypting the received audio signals independently of the formatting module associated with the first telephony client, wherein the encrypting implements an algorithm selected from a group consisting of an IDEA encryption algorithm, a DES encryption algorithm, a GOST algorithm, an RC5 algorithm, and a SEAL algorithm; and computer code for transmitting the encrypted audio signals to the formatting module.

21. A computer-readable medium containing programming instructions for a first telephony client having an associated interpreting module to communicate securely with a second telephony client, the computer-readable medium comprising:

computer code for receiving audio signals from the interpreting module;

computer code for decrypting the received audio signals independently of the interpreting module associated with the first telephony client; and computer code for outputting the decrypted audio signals for transmission to an audio output device.

22. A computer-readable medium as recited in claim 21, wherein the interpreting module is configured to decompress audio signals that are compressed with an algorithm selected from a group consisting of a G.711 codec, a G.723 codec, and a G.729 codec.

23. A computer-readable medium as recited in claim 21, wherein the interpreting module is different for different types of telephony clients and the encrypting is independent of telephony client type.

24. A computer-readable medium as recited in claim 23, wherein the first telephony client has a different type than the second telephony client.

25. A computer-readable medium as recited in claim 21, wherein the interpreting module is implemented in a sound card driver that is configured to interface with a sound card that receives and outputs audio signals.

26. A computer-readable medium as recited in claim 21, wherein decrypting is also performed independently from a communication stack implemented by the first telephony client.

27. A computer-readable medium as recited in claim 21, wherein decrypting is performed independently from the first telephony client.

28. A computer-readable medium as recited in claim 21, wherein the decrypting implements an algorithm selected from a group consisting of an IDEA encryption algorithm, a DES encryption algorithm, a GOST algorithm, an RC5 algorithm, and a SEAL algorithm.

29. A method of transmitting a telephonic signal from a first telephony system to a second telephony system comprising:

initiating a telephonic session between the first and second telephony systems;

encrypting a telephonic signal with a security algorithm;

formatting the encrypted telephonic signal into a predetermined format that is recognizable by the second telephony system, wherein the encrypting is independent of the formatting; and transmitting the telephonic signal to the second telephony system after the telephonic signal has been encrypted and formatted.

30. A method of a first telephony system to receive a telephonic signal from a second telephony system comprising:

receiving a telephonic signal from the second telephony system, the received telephonic signal being formatted into a predetermined format by the second telephony system;

interpreting the predetermined format of the telephonic signal received from the second telephony system; and decrypting the interpreted telephonic signal, the decrypting being performed independently of the interpreting of the predetermined format.

31. A computer system for communicating telephonic signals between a first telephony system and a second telephony system, the computer system comprising:

a formatting module arranged to configure telephonic signals into a first predetermined format that is recognizable by the second telephony system;

an interpreter module arranged to recognize a second predetermined format of telephonic signals received from the second telephony system; and a security module arranged to encrypt telephonic signals prior to transmission to the formatting module and to decrypt telephonic signals received from the interpreter module, wherein the encrypting is independent of the first predetermined format that is recognizable by the second telephony system and the decryption is independent from the second predetermined format of telephony signals received by the first telephony system.

* * * * *